Feb. 26, 1957          E. NORMAN          2,782,919

TOOL SUPPORTING MEANS IN BILLET EXTRUSION PRESSES

Filed July 1, 1952          2 Sheets-Sheet 1

INVENTOR.
ERIC NORMAN
BY Pollard and Johnston
ATTORNEYS

Feb. 26, 1957 E. NORMAN 2,782,919
TOOL SUPPORTING MEANS IN BILLET EXTRUSION PRESSES
Filed July 1, 1952 2 Sheets-Sheet 2

INVENTOR.
ERIC NORMAN
BY
Pollard and Johnston
ATTORNEYS

2,782,919

TOOL SUPPORTING MEANS IN BILLET EXTRUSION PRESSES

Eric Norman, Bournemouth West, England, assignor to The Loewy Engineering Company Limited, London, England, a corporation of Great Britain Application July 1, 1952, Serial No. 296,685

Claims priority, application Great Britain July 4, 1951

2 Claims. (Cl. 207—4)

This invention relates to a billet extrusion press of the type in which the extruded article leaves the billet container in a radial direction with respect to the axis of the container bore, and, in particular, to a press for the extrusion of hollow articles (such as tubing or cable sheathing), for which a mandrel is necessary. In such presses, the mandrel and die—which, for the sake of brevity, will hereafter be referred to as "the tools" of the press—are so positioned that they protrude radially into the container bore from opposite directions, their ends facing each other, a narrow gap being left between these ends through which the extruded metal enters the die; the width of this gap determines, therefore, the wall thickness of the extruded hollow article.

In order to obtain from the press a faultless product of correct dimensions, it is therefore necessary to prevent any uncontrollable changes in the relative positions of mandrel and die during operation of the press. This problem has not so far been satisfactorily solved in the case of radial extrusion presses of the afore-mentioned type.

According to earlier proposals, the tools of these presses or any supporting means provided for them were firmly secured to the billet container or to its holder. During operation of the press, the container, and frequently also its holder, suffered elastic deformations, mainly in the form of radial expansions, which were due to the high temperatures and pressures required for the extrusion of the billets. These deformations would cause the tools to move apart from each other, so that the gap between their ends would become correspondingly wider. Conversely, the gap would contract again as soon as the extrusion was relieved or the temperature dropped.

The changes in the width of the extrusion gap, occuring in this way, were often considerable and apt to lead to the extrusion of hollow articles which, at least for part of their length, were too thin or too thick. This was a serious drawback, as according to present demands, the wall thickness of an article must be kept within close tolerances. Changes in the width of the extrusion gap made themselves particularly felt in the case of articles which were continuously extruded from a series of billets, fed into the container in succession, as this mode of operation necessitated a temporary relief of the extrusion pressure each time a fresh billet was fed into the container; on each such occasion the extrusion gap, whilst still being filled with metal, underwent a contraction, so that continuously extruded articles were often found to show over their entire length a regularly recurrent pattern of deformations in the shape of radial restrictions.

It is an object of the present invention to provide a billet extrusion press of the radial type which is free from the above-described shortcomings and in which, in particular, the tools will not be dislocated from their positions through any elastic deformations of the container or its holder during the operation of the press.

According to the present invention, this object is achieved by providing in a press of the aforementioned type supporting means for the tools which are separate from the container and the parts surrounding the same so as not to be affected by any radial expansion due to elastic deformation. The tools will therefore retain their position relative to each other, and the gap between their ends through which extrusion of the billet metal is effected will retain its preadjusted width under all operational conditions of the press.

In one form of the invention, the supporting means may consist of two crossheads, one for each tool, which are arranged at opposite sides of the container and adapted to carry a tool in their centre. The crossheads may be connected to each other by such elements as tie-rods, so as to form together a closed frame-like structure within which any end-wise forces acting on the tools will cancel themselves out. These forces would therefore not be transmitted to any other parts of the press, such as the container holder, which therefore can be made much lighter than otherwise would be required.

The aforesaid supporting means for the tools may be attached to the container holder, or extensions thereof, at points which are not subjected to any elastic deformation. This may be accomplished by providing the container holder at points remote from the tools with outwardly projecting extensions against which the crossheads are clamped by means of the tie-rods, the latter passing preferably through these extensions and being pre-stressed in order to prevent the extensions from expanding.

An embodiment of the invention will now be described by way of example with reference to the accompanying drawings in which.

Figure 1:
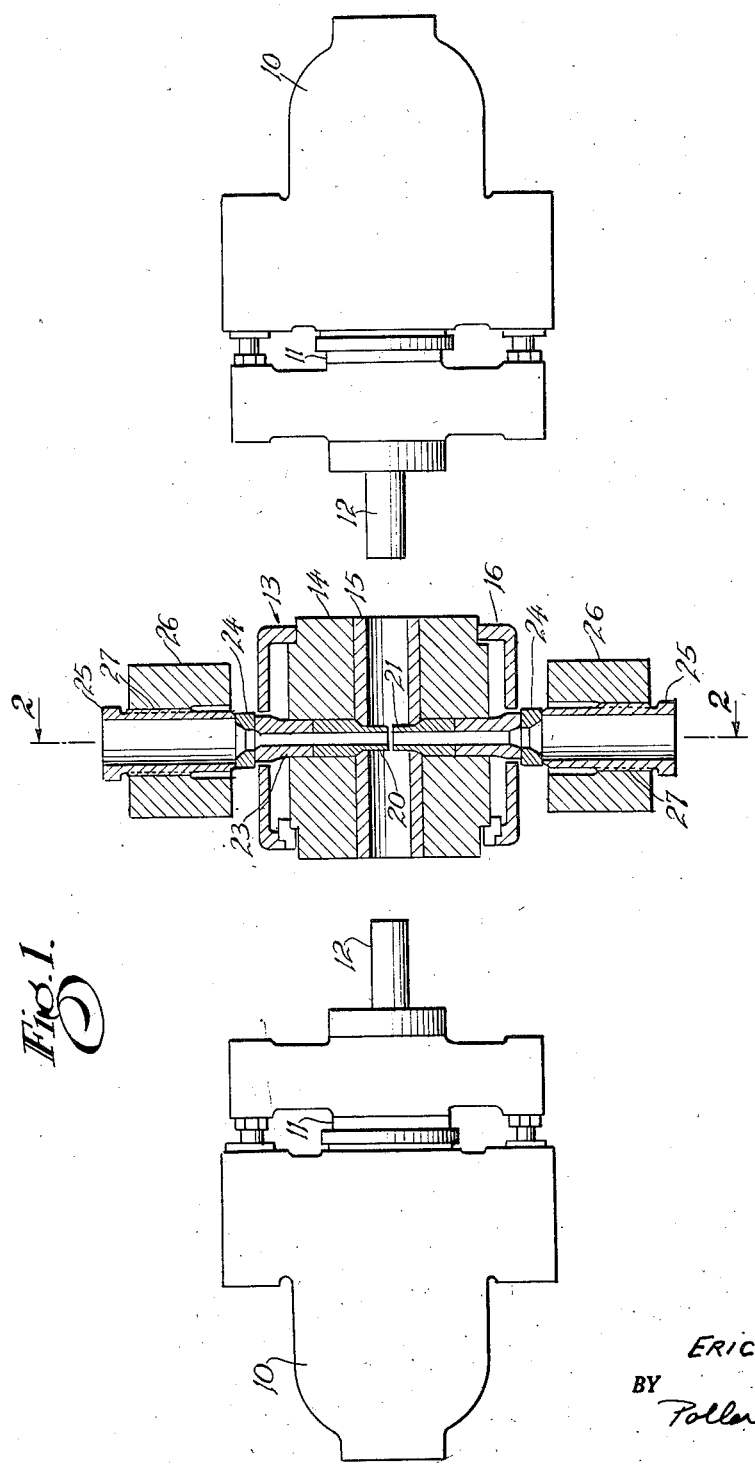
Fig. 1 is a plan view of a radial extrusion press, partly in section, incorporating tool supporting means according to the invention.

The invention is shown in the drawings as being applied to a radial extrusion press of the double-acting type in which the container has a through bore and can therefore be fed with billets at both its ends. The press comprises accordingly two separate main hydraulic cylinders 10, one at each side of the container assembly, the cylinders having rams 11 to which pressing or extrusion stems 12 are attached. This part of the press may be of any suitable and conventional design and need, therefore, not be described in detail.

Figure 2:
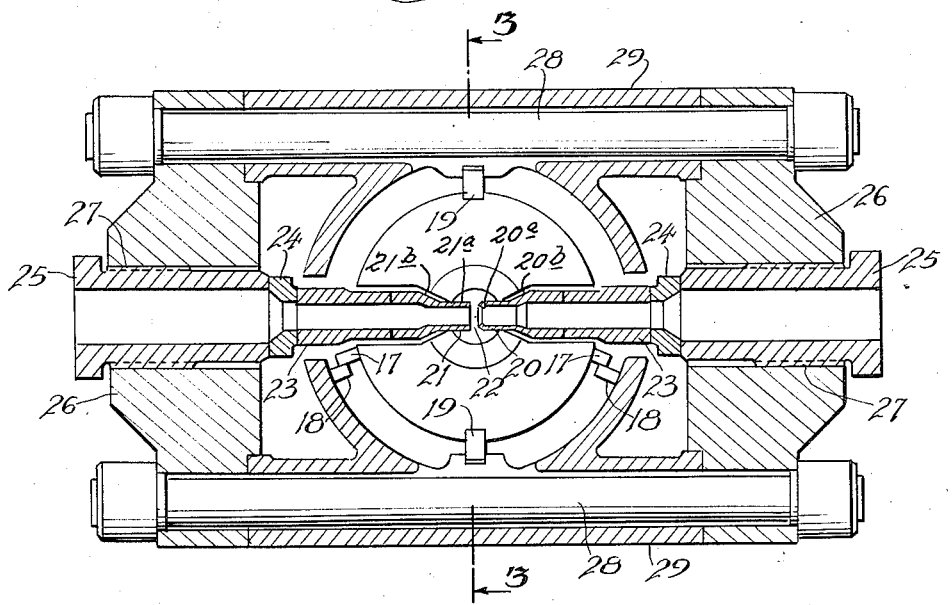
Fig. 2 is a section through the container assembly of the press of Fig. 1 at a larger scale along line II—II of Fig. 1.
Figure 3:
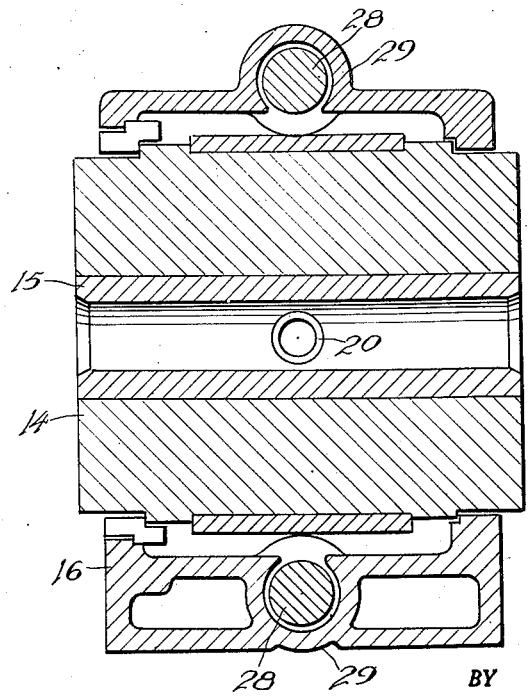
Fig. 3 is a section through the container assembly along the line III—III of Fig. 2.

The container assembly, generally designated by the numeral 13, comprises the billet container proper 14, preferably fitted with a liner 15 of special steel, and a container holder 16. Heating means of any appropriate type, not shown here, are preferably provided in the annular space between the container 14 and its holder 16. The container 14 rests on the holder by means of radial ribs 17, 18 and is held in correct alignment with the other parts of the press by means of a further rib 19 (Fig. 2). By this arrangement radial expansion of the container within the container holder due to elastic deformation may take place without transmitting the expansion forces to the container holder.

The tools of the press include a tubular core 20 and a tubular die 21. The tools are mounted in radial crossbores in the container and are freely slidable therein. As shown in the enlarged scale drawings of Fig. 2, the tools are spaced from the container so as to permit expansion and contraction of the container 14 and liner 15 without disturbing the adjustment of the tools 20 and 21.

The tools are provided with reduced cylindrical end portions 20a and 21a which have a close sliding fit in the cylindrical openings in the liner 15 and are provided with tapered shoulders 20b and 21b back of the openings through the liner 15. The tapered shoulders 20b and 21b are spaced from the container and liner to permit expansion of the container and liner relative to the tools without disturbing the tool adjustment and to permit movement of the tools relative to the container and liner for the purpose of adjustment. The press, which is shown by way of example in the drawings, is destined for the extrusion of cable sheathings from solid billets, and the core 20 is therefore hollow, in order to form a passageway for the unsheathed portion of the cable. It is to be understood that the invention is equally applicable to extrusion presses for other hollow articles than cable sheathings, such as ordinary tubes or hollow sections, in which case, the part 20 will be formed by a solid mandrel. The tools are so positioned in the container 14 that they protrude radially into the bore from opposite directions, their ends facing each other with a narrow gap being left between them at 22, through which the extruded metal enters the die. The width of the gap 22 determines the thickness of the extruded hollow article.

Arranged at the rear of each of the tools 20 and 21 are adaptor sleeves 23, as well as distance pieces 24 in the form of rings. As aforesaid, the tools together with their associated parts 23 and 24, form together units which are arranged in cross-bores of the container assembly 13 in such a way that they are free to be displaced in their axial direction. Provided at the end of each such unit is a fixed backstop 25. Whilst extrusion is in progress, the parts of a tool unit are forced by the extrusion pressure which acts in an end-wise direction in engagement with each other and against the back-stops 25, so that the position of the tools 20 and 21 relative to each other and the width of the gap 22 between their ends is determined by the position of the back-stops 25.

According to the present invention, the backstops 25 are secured to separate crossheads 26 by means of threads 27 which permit small positional adjustments of the backstops to be made and thus control and thereby also of the protrusion of the tools into the container bore. The crossheads 26 carry the tool units in their centre and are connected to each other by means of tie-rods 28 arranged at or near the ends of the crossheads and disposed parallel to the axis of the tools 20 and 21.

The container holder 16 has hollow extensions 29 at points spaced-apart from the tools 20 and 21 through which the tie-rods 28 can pass. This arrangement enables the crossheads 26 to be clamped against the extensions 29.

As will be seen, the crossheads 26, together with the tie-rods 28, form a closed frame-like structure for the support of the tools 20 and 21. This structure is not rigidly secured to any part of the container assembly 13, so that the position of its components is not affected by any elastic deformation of a part belonging to the container assembly 13. The crossheads 26 with the backstops 25, and therefore the tool units, will retain their position independent of any radial expansion of the container 14 or its holder 16.

The tie-rods 28 are preferably prestressed, so that any expansion of the extensions 29 tending to separate the crossheads 26 from each other, will be prevented.

It is to be understood that the invention can be carried out in various other ways than described and shown here.

What is claimed is:

1. A billet extrusion press, including spaced crossheads, a billet container holder between said crossheads, tie rods extending through said crossheads and billet container holder clamping the crossheads and billet container holder together as a rigid unit, axially aligned and opposed hollow extrusion tools extending from the crossheads toward each other, means on each crosshead mounting the tools for axial adjustment and for fixing the tools against movement when adjusted, a billet container in said billet container holder having a main bore, and opposed radial crossbores for the slidable reception of said extrusion tools in said crossbores, the ends of said tools being located in the main bore of said billet container and having a fixed spacing with reference to each other, so as to form an extrusion gap, means located in a plane passing through said main bore and at right angles to the longitudinal axis of said tools for supporting said billet container against movement at right angles to said plane but for radial expansion movement in said plane, and means cooperating with said supporting means for supporting said billet container for radial expansion in said container holder at each side of said plane, whereby said billet container can expand under extrusion pressure without affecting the fixed adjustment of said tools.

2. A billet extrusion press, including spaced crossheads, a billet container holder between said crossheads, means securing the crossheads and billet container holder together as a rigid unit, axially aligned and opposed hollow extrusion tools extending from the crossheads toward each other, means on each crosshead mounting the tools for axial adjustment and for fixing the tools against movement when adjusted, a billet container in said billet container holder having a main bore, and opposed radial crossbores for the slidable reception of said extrusion tools in said crossbores, the ends of said tools being located in the main bore of said billet container and having a fixed spacing with reference to each other, so as to form an extrusion gap, means located in a plane passing through the axis of said main bore and at right angles to the longitudinal axis of said tools for supporting said billet container against movement at right angles to said plane but for radial expansion movement in said plane, and means cooperating with said supporting means for supporting said billet container for radial expansion in said container holder at each side of said plane, whereby said billet container can expand under extrusion pressure without affecting the fixed adjustment of said tools.

References Cited in the file of this patent

UNITED STATES PATENTS

| | | |
|---|---|---|
| 346,563 | Robertson | Aug. 3, 1886 |
| 1,011,522 | Summey | Dec. 12, 1911 |
| 1,011,876 | Summey | Dec. 12, 1911 |
| 1,109,555 | Summey | Sept. 1, 1914 |
| 2,400,055 | Wallace | May 7, 1946 |